(12) United States Patent
Edwards (10) Patent No.: US 11,328,134 B1
(45) Date of Patent: *May 10, 2022

(54) DISPLACEABLE READER CIRCUITRY

(71) Applicant: Square, Inc., San Francisco, CA (US)

(72) Inventor: Troy Edwards, San Francisco, CA (US)

(73) Assignee: Block, Inc., San Francisco, CA (US)

( * ) Notice: Subject to any disclaimer, the term of this patent is extended or adjusted under 35 U.S.C. 154(b) by 181 days.

This patent is subject to a terminal disclaimer.

(21) Appl. No.: 16/780,781

(22) Filed: Feb. 3, 2020

Related U.S. Application Data (63) Continuation of application No. 15/692,501, filed on Aug. 31, 2017, now Pat. No. 10,579,836, which is a continuation of application No. 14/312,524, filed on Jun. 23, 2014, now Pat. No. 9,760,740.

(51) Int. Cl.
*G06Q 20/20* (2012.01)
*G06K 7/00* (2006.01)

(52) U.S. Cl.
CPC ......... *G06K 7/0004* (2013.01); *G06Q 20/204* (2013.01)

(58) Field of Classification Search
None
See application file for complete search history.

(56) References Cited

U.S. PATENT DOCUMENTS

| | | |
|---|---|---|
| 3,128,349 A | 4/1964 | Boesch et al. |
| D284,446 S | 7/1986 | Rosenblad |
| 4,776,003 A | 10/1988 | Harris |
| 4,860,336 A | 8/1989 | D' Avello et al. |
| 5,221,838 A | 6/1993 | Gutman et al. |
| 5,351,296 A | 9/1994 | Sullivan |
| 5,388,155 A | 2/1995 | Smith |
| 5,408,513 A | 4/1995 | Busch, Jr. et al. |
| 5,434,395 A | 7/1995 | Storck et al. |
| 5,485,073 A | 1/1996 | Kasashima et al. |

(Continued)

FOREIGN PATENT DOCUMENTS

| | | |
|---|---|---|
| AU | 2324402 A | 6/2002 |
| CA | 152789 S | 9/2014 |

(Continued)

OTHER PUBLICATIONS

"Connection of Terminal Equipment to the Telephone Network," FCC 47 CFR Part 68, Retrieved from the URL: http://www.tscm.com/FCC47CFRpart68.pdf, on Sep. 24, 2019 Oct. 1, 1999 Edition.

(Continued)

*Primary Examiner* — Paul Danneman
(74) *Attorney, Agent, or Firm* — Polsinelli PC (57) ABSTRACT

Aspects of the technology provide a multi-purpose card reader configured for use with a mobile electronic device (e.g., a mobile host), such as a smart phone or tablet computer. In certain aspects, the card reader is integrated into a case for enclosing the mobile electronic device and configured for reading financial information from a payment card to facilitate a financial transaction between a buyer and a merchant. To facilitate operability of the card reader, the case can include multiple card slots, such as a swipe-slot (e.g., for receiving a magnetic stripe payment card), and a dip-slot (e.g., for use in receiving an IC type payment card).

20 Claims, 6 Drawing Sheets

(56) References Cited

U.S. PATENT DOCUMENTS

| | | | |
|---|---|---|---|
| 5,553,294 A | 9/1996 | Nanno et al. | |
| 5,679,943 A | 10/1997 | Schultz et al. | |
| 5,714,741 A | 2/1998 | Pieterse et al. | |
| 5,729,591 A | 3/1998 | Bailey | |
| 5,740,232 A | 4/1998 | Pailles et al. | |
| 5,763,862 A * | 6/1998 | Jachimowicz | G06K 7/0013 235/380 |
| 5,781,013 A | 7/1998 | Takahashi | |
| 5,835,366 A | 11/1998 | Pleso et al. | |
| 5,838,773 A | 11/1998 | Eisner et al. | |
| 5,850,599 A | 12/1998 | Seiderman | |
| 5,867,795 A | 2/1999 | Novis et al. | |
| 5,933,498 A | 8/1999 | Schneck et al. | |
| 5,940,510 A | 8/1999 | Curry et al. | |
| 5,945,654 A * | 8/1999 | Huang | G06K 7/084 235/449 |
| 5,949,047 A | 9/1999 | Abe et al. | |
| D417,442 S | 12/1999 | Butts et al. | |
| 6,010,067 A | 1/2000 | Elbaum | |
| 6,098,881 A | 8/2000 | Deland, Jr. et al. | |
| 6,144,336 A | 11/2000 | Preston et al. | |
| 6,150,823 A | 11/2000 | Takahashi et al. | |
| 6,213,392 B1 | 4/2001 | Zuppicich | |
| 6,230,267 B1 | 5/2001 | Richards et al. | |
| 6,234,389 B1 | 5/2001 | Valliani et al. | |
| 6,278,779 B1 | 8/2001 | Bryant et al. | |
| 6,355,892 B1 | 3/2002 | Marks | |
| 6,481,623 B1 | 11/2002 | Grant et al. | |
| 6,497,368 B1 | 12/2002 | Friend et al. | |
| D477,321 S | 7/2003 | Baughman | |
| 6,698,654 B1 | 3/2004 | Zuppicich | |
| 6,763,399 B2 | 7/2004 | Margalit et al. | |
| 6,871,278 B1 | 3/2005 | Sciupac | |
| 6,886,742 B2 | 5/2005 | Stoutenburg et al. | |
| 6,945,454 B2 | 9/2005 | Tournemille et al. | |
| 6,990,683 B2 | 1/2006 | Itabashi | |
| 7,003,316 B1 | 2/2006 | Elias et al. | |
| 7,066,382 B2 | 6/2006 | Kaplan | |
| 7,083,090 B2 | 8/2006 | Zuili | |
| 7,163,148 B2 | 1/2007 | Durbin et al. | |
| 7,210,627 B2 | 5/2007 | Morley et al. | |
| D553,459 S | 10/2007 | Shor | |
| 7,357,309 B2 | 4/2008 | Ghosh et al. | |
| 7,363,054 B2 | 4/2008 | Elias et al. | |
| D568,130 S | 5/2008 | Arns | |
| D575,056 S | 8/2008 | Tan | |
| 7,424,732 B2 | 9/2008 | Matsumoto et al. | |
| 7,433,452 B2 | 10/2008 | Taylor et al. | |
| D590,828 S | 4/2009 | Sherrod et al. | |
| D600,085 S | 9/2009 | Mandel et al. | |
| 7,587,756 B2 | 9/2009 | Peart et al. | |
| 7,591,425 B1 | 9/2009 | Zuili et al. | |
| D607,000 S | 12/2009 | Cheng et al. | |
| 7,668,308 B1 | 2/2010 | Wurtz | |
| 7,673,799 B2 | 3/2010 | Hart et al. | |
| D620,330 S | 7/2010 | Krumpe et al. | |
| D624,912 S | 10/2010 | Chen et al. | |
| 7,810,729 B2 * | 10/2010 | Morley, Jr. | G06K 7/082 235/449 |
| D630,073 S | 1/2011 | Krumpe et al. | |
| 7,874,483 B2 | 1/2011 | Wang et al. | |
| D646,264 S | 10/2011 | Dong | |
| 8,086,531 B2 | 12/2011 | Litster et al. | |
| D653,664 S | 2/2012 | Turnbull et al. | |
| 8,117,453 B2 | 2/2012 | Huque | |
| 8,126,734 B2 | 2/2012 | Dicks et al. | |
| D655,588 S | 3/2012 | Pennington et al. | |
| 8,132,670 B1 | 3/2012 | Chen | |
| 8,181,871 B2 | 5/2012 | Wang et al. | |
| 8,265,553 B2 | 9/2012 | Cheon et al. | |
| D668,125 S | 10/2012 | Pennington et al. | |
| 8,281,998 B2 | 10/2012 | Tang et al. | |
| 8,297,507 B2 | 10/2012 | Kayani | |
| 8,336,771 B2 | 12/2012 | Tsai et al. | |
| D675,618 S | 2/2013 | Behar et al. | |
| D677,667 S | 3/2013 | Smith et al. | |
| 8,397,103 B2 | 3/2013 | Baba | |
| 8,397,988 B1 | 3/2013 | Zuili | |
| D679,714 S | 4/2013 | Smith et al. | |
| D680,537 S | 4/2013 | Miller et al. | |
| 8,452,004 B2 | 5/2013 | Lee | |
| D686,208 S | 7/2013 | Miller et al. | |
| 8,500,018 B2 | 8/2013 | McKelvey et al. | |
| D689,753 S | 9/2013 | Yoo et al. | |
| 8,573,486 B2 | 11/2013 | McKelvey et al. | |
| 8,573,487 B2 | 11/2013 | McKelvey | |
| 8,584,945 B2 | 11/2013 | Wang et al. | |
| D700,606 S | 3/2014 | Lo | |
| D703,211 S | 4/2014 | Weller et al. | |
| D706,266 S | 6/2014 | Rotsaert | |
| 8,740,072 B1 | 6/2014 | Dorogusker | |
| 8,751,039 B1 | 6/2014 | Macoviak et al. | |
| D711,876 S | 8/2014 | McWilliam et al. | |
| 8,807,431 B2 | 8/2014 | Wang et al. | |
| D712,892 S | 9/2014 | Hong et al. | |
| 8,840,017 B2 | 9/2014 | Chan et al. | |
| 8,840,024 B2 | 9/2014 | McKelvey et al. | |
| 8,875,990 B2 | 11/2014 | Bishop et al. | |
| D724,094 S | 3/2015 | Blochinger et al. | |
| D725,655 S | 3/2015 | Debaigue et al. | |
| 8,983,873 B2 | 3/2015 | Lund | |
| D726,171 S | 4/2015 | Edwards | |
| 9,016,570 B1 | 4/2015 | Gluck | |
| 9,020,853 B2 | 4/2015 | Hoffman et al. | |
| D728,549 S | 5/2015 | Su et al. | |
| D728,568 S | 5/2015 | Debaigue et al. | |
| D731,493 S | 6/2015 | Mills | |
| 9,063,737 B2 | 6/2015 | Babu et al. | |
| 9,123,036 B2 | 9/2015 | Graylin et al. | |
| D740,285 S | 10/2015 | Templeton | |
| D740,286 S | 10/2015 | Templeton | |
| D740,820 S | 10/2015 | Templeton et al. | |
| 9,256,770 B1 | 2/2016 | Edwards | |
| 9,355,285 B1 | 5/2016 | Wade et al. | |
| D762,651 S | 8/2016 | Edwards et al. | |
| D766,238 S | 9/2016 | Nguyen | |
| D766,901 S | 9/2016 | Nguyen | |
| D774,510 S | 12/2016 | Rotsaert | |
| D776,658 S | 1/2017 | Zhu et al. | |
| 9,576,159 B1 | 2/2017 | Templeton et al. | |
| D780,731 S | 3/2017 | Kim et al. | |
| 9,607,298 B2 | 3/2017 | Brudnicki et al. | |
| 9,659,195 B2 | 5/2017 | Wade et al. | |
| 9,665,867 B2 | 5/2017 | Guise et al. | |
| 9,667,426 B2 | 5/2017 | Sekiya et al. | |
| 9,679,286 B2 | 6/2017 | Colnot et al. | |
| D795,869 S | 8/2017 | Templeton | |
| 9,736,144 B2 | 8/2017 | McCanna et al. | |
| 9,740,849 B2 | 8/2017 | Etchegoyen et al. | |
| 9,760,740 B1 | 9/2017 | Edwards | |
| 9,760,962 B2 | 9/2017 | Lese | |
| 9,769,134 B2 | 9/2017 | Dominguez et al. | |
| 9,788,205 B2 | 10/2017 | Sarmah et al. | |
| 9,836,594 B2 | 12/2017 | Zhang et al. | |
| 9,836,601 B2 | 12/2017 | Pulapaka et al. | |
| 9,852,412 B1 | 12/2017 | Post et al. | |
| 9,870,491 B1 | 1/2018 | Wade | |
| 10,475,024 B1 | 11/2019 | Behren et al. | |
| 10,579,836 B1 * | 3/2020 | Edwards | G07F 7/0893 |
| 2002/0084771 A1 | 7/2002 | Lundberg | |
| 2002/0091633 A1 | 7/2002 | Proctor | |
| 2002/0153414 A1 | 10/2002 | Stoutenburg et al. | |
| 2003/0135418 A1 | 7/2003 | Shekhar et al. | |
| 2003/0154414 A1 | 8/2003 | von Mueller et al. | |
| 2003/0183691 A1 | 10/2003 | Lahteenmaki et al. | |
| 2004/0012875 A1 | 1/2004 | Wood | |
| 2004/0041911 A1 | 3/2004 | Odagiri et al. | |
| 2004/0059682 A1 | 3/2004 | Hasumi et al. | |
| 2004/0151026 A1 | 8/2004 | Naso et al. | |
| 2004/0167820 A1 | 8/2004 | Melick et al. | |
| 2004/0178326 A1 | 9/2004 | Hamilton et al. | |
| 2004/0204082 A1 | 10/2004 | Abeyta | |
| 2004/0251907 A1 | 12/2004 | Kalley | |
| 2005/0023348 A1 | 2/2005 | Lucas et al. | |

(56) References Cited

U.S. PATENT DOCUMENTS

| | | |
|---|---|---|
| 2005/0097015 A1 | 5/2005 | Wilkes et al. |
| 2005/0109841 A1 | 5/2005 | Ryan et al. |
| 2005/0164631 A1 | 7/2005 | Jin |
| 2005/0236480 A1 | 10/2005 | Vrotsos et al. |
| 2005/0242171 A1 | 11/2005 | Smets et al. |
| 2006/0032905 A1 | 2/2006 | Bear et al. |
| 2006/0049255 A1 | 3/2006 | von Mueller et al. |
| 2006/0095551 A1 | 5/2006 | Leung et al. |
| 2006/0219776 A1 | 10/2006 | Finn |
| 2006/0223580 A1 | 10/2006 | Antonio et al. |
| 2006/0255128 A1 | 11/2006 | Johnson et al. |
| 2007/0063048 A1 | 3/2007 | Havens et al. |
| 2007/0067833 A1 | 3/2007 | Colnot |
| 2007/0118736 A1 | 5/2007 | Huque |
| 2007/0168300 A1 | 7/2007 | Quesselaire et al. |
| 2007/0194104 A1 | 8/2007 | Fukuda et al. |
| 2007/0198436 A1 | 8/2007 | Weiss |
| 2007/0241182 A1 | 10/2007 | Buer |
| 2007/0255643 A1 | 11/2007 | Capuano et al. |
| 2007/0276765 A1 | 11/2007 | Hazel et al. |
| 2007/0285056 A1 | 12/2007 | Yoon et al. |
| 2008/0011850 A1* | 1/2008 | Henry ............... G06K 7/0004 235/441 |
| 2008/0091617 A1 | 4/2008 | Hazel et al. |
| 2008/0094069 A1 | 4/2008 | Huang |
| 2008/0123862 A1 | 5/2008 | Rowley |
| 2008/0159543 A1 | 7/2008 | Frisch et al. |
| 2008/0301056 A1 | 12/2008 | Weller et al. |
| 2009/0070583 A1 | 3/2009 | von Mueller et al. |
| 2009/0103725 A1 | 4/2009 | Tang et al. |
| 2009/0112768 A1 | 4/2009 | Hammad et al. |
| 2009/0128090 A1 | 5/2009 | Bi |
| 2009/0144202 A1 | 6/2009 | Hurry |
| 2009/0150294 A1 | 6/2009 | March et al. |
| 2009/0164326 A1 | 6/2009 | Bishop et al. |
| 2009/0198618 A1 | 8/2009 | Chan et al. |
| 2009/0224771 A1 | 9/2009 | Deveau et al. |
| 2009/0261166 A1 | 10/2009 | Lawson et al. |
| 2009/0284877 A1 | 11/2009 | Heravi et al. |
| 2009/0302806 A1 | 12/2009 | Lindlar et al. |
| 2010/0057620 A1 | 3/2010 | Li et al. |
| 2010/0128449 A1 | 5/2010 | Mangaroo |
| 2010/0138666 A1 | 6/2010 | Adams et al. |
| 2010/0243732 A1 | 9/2010 | Wallner |
| 2010/0289390 A1 | 11/2010 | Kenney |
| 2010/0314446 A1 | 12/2010 | Morley, Jr. |
| 2011/0078081 A1 | 3/2011 | Pirzadeh et al. |
| 2011/0121654 A1 | 5/2011 | Recker et al. |
| 2011/0253788 A1 | 10/2011 | Campbell et al. |
| 2011/0307733 A1 | 12/2011 | Tokunaga |
| 2011/0309145 A1 | 12/2011 | Richardson et al. |
| 2012/0005039 A1 | 1/2012 | Dorsey et al. |
| 2012/0005096 A1 | 1/2012 | Dorsey et al. |
| 2012/0011071 A1 | 1/2012 | Pennock et al. |
| 2012/0032681 A1 | 2/2012 | Fink |
| 2012/0051554 A1 | 3/2012 | Modi et al. |
| 2012/0052910 A1 | 3/2012 | Mu et al. |
| 2012/0091200 A1 | 4/2012 | McKelvey et al. |
| 2012/0091201 A1 | 4/2012 | Babu et al. |
| 2012/0095868 A1 | 4/2012 | McKelvey |
| 2012/0095869 A1 | 4/2012 | McKelvey |
| 2012/0095870 A1 | 4/2012 | McKelvey |
| 2012/0095871 A1 | 4/2012 | Dorsey et al. |
| 2012/0095906 A1 | 4/2012 | Dorsey et al. |
| 2012/0095907 A1 | 4/2012 | Dorsey et al. |
| 2012/0095915 A1 | 4/2012 | McKelvey |
| 2012/0095916 A1 | 4/2012 | Dorsey et al. |
| 2012/0097739 A1 | 4/2012 | Babu et al. |
| 2012/0097740 A1 | 4/2012 | Lamba et al. |
| 2012/0118956 A1 | 5/2012 | Lamba et al. |
| 2012/0118959 A1 | 5/2012 | Sather et al. |
| 2012/0118960 A1 | 5/2012 | Sather et al. |
| 2012/0126005 A1 | 5/2012 | Dorsey et al. |
| 2012/0126006 A1 | 5/2012 | Dorsey et al. |
| 2012/0126007 A1 | 5/2012 | Lamba et al. |
| 2012/0126010 A1 | 5/2012 | Babu et al. |
| 2012/0126011 A1 | 5/2012 | Lamba et al. |
| 2012/0126012 A1 | 5/2012 | Lamba et al. |
| 2012/0126013 A1 | 5/2012 | Sather et al. |
| 2012/0126014 A1 | 5/2012 | Sather et al. |
| 2012/0130903 A1 | 5/2012 | Dorsey et al. |
| 2012/0132712 A1 | 5/2012 | Babu et al. |
| 2012/0138683 A1 | 6/2012 | Sather et al. |
| 2012/0168505 A1 | 7/2012 | Sather et al. |
| 2012/0210325 A1 | 8/2012 | de Lind van Wijngaarden et al. |
| 2012/0211558 A1 | 8/2012 | Buer |
| 2012/0234918 A1 | 9/2012 | Lindsay |
| 2012/0270528 A1 | 10/2012 | Goodman |
| 2012/0305645 A1 | 12/2012 | Morley, Jr. |
| 2012/0323512 A1 | 12/2012 | Rhodin |
| 2013/0021046 A1 | 1/2013 | Prentice et al. |
| 2013/0024372 A1 | 1/2013 | Spodak et al. |
| 2013/0030997 A1 | 1/2013 | Spodak et al. |
| 2013/0077229 A1 | 3/2013 | Tsai et al. |
| 2013/0087614 A1 | 4/2013 | Limtao et al. |
| 2013/0130743 A1 | 5/2013 | Lin |
| 2013/0140899 A1 | 6/2013 | Tuukkanen et al. |
| 2013/0144792 A1 | 6/2013 | Nilsson et al. |
| 2013/0185559 A1 | 7/2013 | Morel et al. |
| 2013/0211929 A1 | 8/2013 | Itwaru |
| 2013/0289908 A1 | 10/2013 | Nonoyama |
| 2013/0290762 A1 | 10/2013 | Pawar |
| 2013/0303277 A1 | 11/2013 | Shigeta |
| 2013/0313903 A1 | 11/2013 | Kayama |
| 2014/0089205 A1 | 3/2014 | Kapur et al. |
| 2014/0097242 A1 | 4/2014 | McKelvey |
| 2014/0120866 A1 | 5/2014 | Furtney |
| 2014/0124576 A1 | 5/2014 | Zhou et al. |
| 2014/0167503 A1 | 6/2014 | Redpath et al. |
| 2014/0203082 A1 | 7/2014 | Huh |
| 2014/0258132 A1 | 9/2014 | Swamy et al. |
| 2014/0295761 A1 | 10/2014 | Lo |
| 2014/0297539 A1 | 10/2014 | Swamy et al. |
| 2014/0312691 A1 | 10/2014 | Doljack et al. |
| 2015/0025822 A1 | 1/2015 | Ladret |
| 2015/0058654 A1 | 2/2015 | Ukai et al. |
| 2015/0078560 A1 | 3/2015 | Ilango et al. |
| 2015/0132624 A1 | 5/2015 | Nagato |
| 2016/0034881 A1 | 2/2016 | Post et al. |
| 2016/0161565 A1 | 6/2016 | Wade |
| 2016/0275478 A1 | 9/2016 | Li et al. |

FOREIGN PATENT DOCUMENTS

| | | |
|---|---|---|
| CA | 2 920 589 A1 | 8/2016 |
| CN | 302341093 S | 3/2013 |
| CN | 302526592 S | 8/2013 |
| DE | 20320080 U1 | 4/2004 |
| EP | 0 895 203 A2 | 2/1999 |
| EP | 1 874 014 A2 | 1/2008 |
| EP | 1 895 312 A1 | 3/2008 |
| EP | 2 693 298 A2 | 2/2014 |
| EP | 3 091 474 A1 | 11/2016 |
| FR | 2 812 744 A1 | 2/2002 |
| FR | 2 812 745 A1 | 2/2002 |
| FR | 2 834 156 A1 | 6/2003 |
| JP | H09231285 A | 9/1997 |
| JP | 2000-030146 A | 1/2000 |
| JP | 2000-276539 A | 10/2000 |
| JP | 2001-222595 A | 8/2001 |
| JP | 2002-074507 A | 3/2002 |
| JP | 2002-123771 A | 4/2002 |
| JP | 2002-279320 A | 9/2002 |
| JP | 2002-352166 A | 12/2002 |
| JP | 2002-358285 A | 12/2002 |
| JP | 2003-108777 A | 4/2003 |
| JP | 2003-281453 A | 10/2003 |
| JP | 2003-308438 A | 10/2003 |
| JP | 2004-054651 A | 2/2004 |
| JP | 2004-062733 A | 2/2004 |
| JP | 2004-078553 A | 3/2004 |
| JP | 2004-078662 A | 3/2004 |
| JP | 2004-199405 A | 7/2004 |
| JP | 4248820 B2 | 4/2009 |

(56) References Cited

FOREIGN PATENT DOCUMENTS

| KR | 10-1999-0066397 | A | 8/1999 |
|---|---|---|---|
| KR | 10-1999-0068618 | A | 9/1999 |
| KR | 200225019 | B1 | 3/2001 |
| KR | 10-2003-0005936 | A | 1/2003 |
| KR | 10-2003-0005984 | A | 1/2003 |
| KR | 10-2003-0012910 | A | 2/2003 |
| KR | 200333809 | B1 | 11/2003 |
| KR | 10-2004-0016548 | A | 2/2004 |
| KR | 100447431 | B1 | 8/2004 |
| KR | 200405877 | B1 | 1/2006 |
| KR | 100649151 | B1 | 11/2006 |
| KR | 10-2007-0107990 | A | 11/2007 |
| KR | 100842484 | B1 | 6/2008 |
| RU | 2284578 | C1 | 9/2006 |
| WO | 1998/012674 | A2 | 3/1998 |
| WO | 2000/011624 | A1 | 3/2000 |
| WO | 2000/025277 | A1 | 5/2000 |
| WO | 2001/086599 | A2 | 11/2001 |
| WO | 2002/033669 | A1 | 4/2002 |
| WO | 2002/043020 | A2 | 5/2002 |
| WO | 2002/082388 | A1 | 10/2002 |
| WO | 2002/084548 | A1 | 10/2002 |
| WO | 2003/044710 | A1 | 5/2003 |
| WO | 2003/079259 | A1 | 9/2003 |
| WO | 2004/023366 | A1 | 3/2004 |
| WO | 2006/131708 | A1 | 12/2006 |
| WO | 2012/103138 | A1 | 8/2012 |
| WO | 2016/019206 | A1 | 2/2016 |
| WO | 2016/094419 | A1 | 6/2016 |

OTHER PUBLICATIONS

"EMBEDDED FINancial transactional IC card READer," Retrieved from the URL: https://cordis.europa.eu/project/rcn/58338/factsheet/en.
Geethapriya Venkataramani and Srividya Gopalan., "Mobile phone based RFID architecture for secure electronic payments using RFID credit cards," 2007 IEEE, (ARES'07).
"Guideline for the Use of Advanced Authentication Technology," FIPS 190, Sep. 28, 1994.
Guy, N., "Review: Square, Inc. Square Credit Card Reader (2013)," iLounge, dated Jan. 16, 2014, Retrieved from the Internet URL: http://www.ilounge.com/index.php/reviews/entry/square-inc.-square-credit-card-reader-2013/, on Feb. 19, 2015 , pp. 1-4.
"Identification cards—Recording technique—Part 4—Location of read-only magnetic tracks—Track 1 and 2," ISO/IEC 7811-4:1995, International Organization for Standardization, Aug. 1995.
Jerome Svigals., "The Long Life and Imminent Death of the Mag-stripe Card," IEEE Spectrum, vol. 49, Issue 61, Jun. 2012.
Jorgensen, A., "Square," dated Nov. 19, 2010, Retrieved from the Internet URL: http://andrew.jorgensenfamily.us/2010/11/square/, on Jun. 6, 2014, p. 1-3.
"Kuphaldt, T.R., "Practical Considerations—Batteries," Lessons In Electric Circuits, Batteries and Power Systems, Chapter 11, vol. I—DC, Retrieved from the Internet URL: www.allaboutcircuits.com/textbook/direct-current/chpt-11 /practical-considerations-batteries, on Jun. 9, 2017, pp. 1-5".
"Magensa's Decryption Services and MagTek's MagneSafe™ Bluetooth Readers Selected by eProcessing Network to Implement Secure Customer Card Data with Mobile Devices," Retrieved from the URL: https://www.magnensa.net/aboutus/articles/eProcessing—rev1.pdf Apr. 14, 2008.
Martha E. Haykin et al., "Smart Card Technology: New Methods for Computer Access Control," NIST Special Publication 500-157, Sep. 1988.
"MSP430x1xx Family User's Guide," (including 2016 correction sheet at 2), Texas Instruments Inc., 2006.
Ryan, P., "Plug and Pay: A Gallery of 26 Mobile Card Readers," Aug. 20, 2013, Retrieved from the Internet URL: http://bankinnovation.net/2013/08/plug-and-pay-a-gallery-of-26-mobile-card-readers/, on Feb. 19, 2015, pp. 1-12.
Schaerer, T., "Vom Fensterkomparator zum Prazisions-Schmitt-Trigger," Elektronik Kompendium, Retrieved from the Internet URL: https://web.archive.org/web/20140805054448/http://www.elektronik-kompendium.de/public/schaerer/wincst.htm, pp. 1-22 (Aug. 5, 2014).
Scherz, P., "Practical Electronics for Inventors," The McGraw-Hill Companies, Inc., pp. 1-8 (2000).
Spegele, Joseph Brain., "A Framework for Evaluating Application of Smart Cards and Related Technology Within the Department of Defense," Naval Postgraduate School, Jan. 1995.
Stephen A. Sherman et al., "Secure Network Access Using Multiple Applications of AT&T's Smart Card," AT&T Technical Journal, Sep./Oct. 1994.
Thomas, T., "iPhone Credit Card Readers," dated Feb. 11, 2011, Retrieved from the Internet URL: <http://credit-card-processing-review.toptenreviews.com/mobile-credit-card-processing/iphone-credit-card-readers-pg9.html>., on Jun. 6, 2014, p. 1-3.
Wehner, M., "The Unofficial Apple Weblog, Square credit card reader loses weight, gains accuracy", TUAW, dated Dec. 9, 2013, Retrieved from the Internet URL: http://www.tuaw.com/2013/12/09/square-credit-card-reader-loses-weight-gains-accuracy/, on Feb. 19, 2015, p. 1.
White, R., "How Computers Work," Que, Seventh Edition, pp. 1-23 (Oct. 15, 2003).
Non-Final Office Action dated Oct. 8, 2013, for U.S. Appl. No. 13/826,171, of Dorogusker, J., filed Mar. 14, 2013.
Notice of Allowance dated Jan. 24, 2014, for U.S. Appl. No. 13/826,171, of Dorogusker, J., filed Mar. 14, 2013.
Non-Final Office Action dated Jan. 29, 2014, in Design U.S. Appl. No. 29/447,765, of Templeton T., filed Mar. 6, 2013.
Non-Final Office Action dated Sep. 10, 2014, in Design U.S. Appl. No. 29/447,765, of Templeton T., filed Mar. 6, 2013.
Certificate of Design Registration for European Patent Application No. 002578674, dated Nov. 14, 2014.
Notification of Registration of a Design for Australian Application No. 201415781, dated Nov. 27, 2014.
First Examination Report for Indian Design Application No. 267386, dated Feb. 5, 2015.
Non-Final Office Action dated Feb. 20, 2015 for U.S. Appl. No. 14/512,104, of Templeton, T., et al., filed Oct. 10, 2014.
First Examination Report for Australian Design Application No. 201415781, dated Feb. 23, 2015.
Final Office Action dated Mar. 20, 2015, in Design U.S. Appl. No. 29/447,765, of Templeton T., filed Mar. 6, 2013.
English-language translation of Notice of Reasons for Rejection for Japanese Application No. 2014-025525, dated Mar. 31, 2015.
Notice of Allowance dated Jun. 5, 2015, in Design U.S. Appl. No. 29/447,765, of Templeton T., filed Mar. 6, 2013.
Notice of Allowance dated Jun. 10, 2015, for Design U.S. Appl. No. 29/491,147, of Templeton T., et al., filed May 16, 2014.
Examiner's Report for Canadian Industrial Design Application No. 159528, dated Jun. 11, 2015.
Non-Final Office Action dated Jun. 22, 2015 for U.S. Appl. No. 14/322,815, of Edwards, T., filed Jul. 2, 2014.
Certificate of Registration of Design for Indian Design Application No. 267386 dated Jul. 7, 2015.
Non-Final Office Action dated Jul. 27, 2015 for Design U.S. Appl. No. 29/493,212, of Edwards, T., et al., filed Jun. 6, 2014.
Non-Final Office Action dated Jul. 30, 2015, for U.S. Appl. No. 13/652,365, of Behren, R.V., et al., filed Oct. 15, 2012.
Second Examination Report for Australian Design Application No. 201415781, dated Aug. 13, 2015.
Non-Final Office Action dated Sep. 18, 2015, for U.S. Appl. No. 14/450,128, of Wade, J., filed Aug. 1, 2014.
Notice of Allowance dated Oct. 5, 2015 for U.S. Appl. No. 14/322,815, of Edwards, T., filed Jul. 2, 2014.
English-language translation of Final Rejection for Japanese Application No. 2014-025525, dated Oct. 20, 2015.
Non-Final Office Action dated Oct. 29, 2015 for U.S. Appl. No. 14/512,104, of Templeton, T., et al., filed Oct. 10, 2014.
Ex parte Quayle Action mailed Nov. 20, 2015 for U.S. Appl. No. 14/620,699, of Wade, J., et al., filed Feb. 12, 2015.

(56) References Cited

OTHER PUBLICATIONS

Examiner's Report for Canadian Industrial Design Application No. 159528, dated Dec. 1, 2015.
Final Office Action dated Jan. 15, 2016, for Design U.S. Appl. No. 29/493,212, of Edwards, T., et al., filed Jun. 6, 2014.
Notice of Allowance dated Feb. 5, 2016, for U.S. Appl. No. 14/620,699, of Wade, J., et al., filed Feb. 12, 2015.
Examiner Requisition for Canadian Patent Application No. 2,920,589, dated Mar. 11, 2016.
Final Office Action dated Mar. 16, 2016, for U.S. Appl. No. 13/652,365, of Behren, R.V., et al., filed Oct. 15, 2012.
Notice of Allowance dated Mar. 28, 2016, for Design U.S. Appl. No. 29/493,212, of Edwards, T., et al., filed Jun. 6, 2014.
Non-Final Office Action dated Apr. 11, 2016, for U.S. Appl. No. 14/450,128, of Wade, J., filed Aug. 1, 2014.
Non-Final Office Action dated May 6, 2016, for U.S. Appl. No. 14/512,104, of Templeton, T., et al., filed Oct. 10, 2014.
Non-Final Office Action dated Aug. 16, 2016, for U.S. Appl. No. 14/312,524, of Edwards, T., filed Jun. 23, 2014.
Non-Final Office Action dated Aug. 17, 2016, for U.S. Appl. No. 14/985,624, of Wade, J., et al., filed Dec. 31, 2015.
Notice of Allowance for Canadian Patent Application No. 2,920,589, dated Sep. 21, 2016.
Notice of Allowance dated Oct. 7, 2016, for U.S. Appl. No. 14/512,104, of Templeton, T., et al., filed Oct. 10, 2014.
Non-Final Office Action dated Oct. 28, 2016, for U.S. Appl. No. 14/450,128, of Wade, J., filed Aug. 1, 2014.
Notice of Allowance dated Jan. 12, 2017, for U.S. Appl. No. 14/985,624, of Wade, J., et al., filed Dec. 31, 2015.
Non-Final Office Action dated Jan. 13, 2017, for U.S. Appl. No. 14/448,714, of Post, D., et al., filed Jul. 31, 2014.
Non-Final Office Action dated Feb. 9, 2017, for U.S. Appl. No. 14/472,217, of Post, D.J., et al., filed Aug. 28, 2014.
Final Office Action dated Feb. 23, 2017, for U.S. Appl. No. 14/312,524, of Edwards, T., filed Jun. 23, 2014.
Certificate of Industrial Design Registration for Canadian Design Application No. 159528, dated Feb. 27, 2017.
Certificate of Industrial Design Registration for Canadian Design Application No. 166511, dated Feb. 27, 2017.
Corrected Notice of Allowance dated Apr. 10, 2017, for U.S. Appl. No. 14/985,624, of Wade, J., et al., filed Dec. 31, 2015.
Notice of Allowance dated May 5, 2017, for U.S. Appl. No. 14/312,524, of Edwards, T., filed Jun. 23, 2014.
Notice of Allowance dated Jun. 12, 2017, for Design U.S. Appl. No. 29/539,675, of Templeton, T., filed Sep. 16, 2015.
Final Office Action dated Jun. 16, 2017, for U.S. Appl. No. 14/450,128, of Wade, J., filed Aug. 1, 2014.
Non-Final Office Action dated Jul. 10, 2017, for U.S. Appl. No. 14/448,714, of Post, D., et al., filed Jul. 31, 2014.
Non-Final Office Action dated Jul. 28, 2017, for U.S. Appl. No. 13/652,365, of Behren, R.V., et al., filed Oct. 15, 2012.
Non-Final Office Action dated Aug. 9, 2017, for U.S. Appl. No. 14/565,277, of Wade, J., filed Dec. 9, 2014.
Notice of Allowance dated Aug. 22, 2017, for U.S. Appl. No. 14/472,217, of Post, D.J., et al., filed Aug. 28, 2014.
Notice of Allowance dated Aug. 31, 2017, for U.S. Appl. No. 14/450,128, of Wade, J., filed Aug. 1, 2014.
Office Action for European Patent Application No. 16 155 374.8, dated Oct. 18, 2017.
Final Office Action dated Mar. 7, 2018, for U.S. Appl. No. 13/652,365, of Behren, R.V., et al., filed Oct. 15, 2012.
Final Office Action dated Mar. 27, 2018, for U.S. Appl. No. 14/448,714, of Post, D., et al., filed Jul. 31, 2014.
Notice of Allowance dated Jun. 5, 2018, for U.S. Appl. No. 14/448,714, of Post, D., et al., filed Jul. 31, 2014.
Advisory Action dated Jun. 6, 2018, for U.S. Appl. No. 13/652,365, of Behren, R.V., et al., filed Oct. 15, 2012.
Final Office Action dated Sep. 28, 2018, for U.S. Appl. No. 14/565,277, of Wade, J., filed Sep. 12, 2014.
Advisory Action dated Dec. 13, 2018, for U.S. Appl. No. 14/565,277, of Wade, J., filed Sep. 12, 2014.
Summons to attend oral proceedings for European Patent Application No. 16 155 374.8, mailed Mar. 5, 2019.
Non-Final Office Action dated Apr. 10, 2019, for U.S. Appl. No. 14/565,277, of Wade, J., filed Dec. 9, 2014.
Notice of Allowance dated Jul. 3, 2019, for U.S. Appl. No. 13/652,365, of Behren, R.V., et al., filed Oct. 15, 2012.
Non-Final Office Action dated Aug. 14, 2019, for U.S. Appl. No. 15/692,501, of Edwards T., filed Aug. 31, 2017.
Final Office Action dated Sep. 9, 2019, for U.S. Appl. No. 14/565,277, of Wade, J., filed Dec. 9, 2014.
Notice of Allowance dated Oct. 22, 2019, for U.S. Appl. No. 15/692,501, of Edwards, T., filed Aug. 31, 2017.
Advisory Action dated Nov. 26, 2019, for U.S. Appl. No. 14/565,277, of Wade, J., filed Sep. 12, 2014.
Non-Final Office Action dated Jan. 3, 2020, for U.S. Appl. No. 14/565,277, of Wade, J., filed Dec. 9, 2014.
Notice of Allowance dated Apr. 15, 2020, for U.S. Appl. No. 14/565,277, of Wade, J., filed Dec. 9, 2014.
Decision to Grant for European Patent Application No. 16155374.8, dated Nov. 14, 2019.
International Search Report and Written Opinion for International Application No. PCT/US2015/043027, dated Nov. 4, 2015.
International Search Report and Written Opinion for International Application No. PCT/US2015/064524, dated Feb. 19, 2016.
Extended European Search Report for European Patent Application No. 16 155 374.8, dated Oct. 11, 201.
Extended European Search Report for European Patent Application No. 15866468.0, dated Dec. 14, 2017.
Intention to Grant for European Patent Application No. 15866468.0, dated Nov. 13, 2018.
Decision to Grant for European Patent Application No. 15866468.0, dated Mar. 21, 2019.
Supplemental Notice of Allowability dated May 18, 2020, for U.S. Appl. No. 14/565,277, of Wade, J., filed Dec. 9, 2014.

* cited by examiner

DISPLACEABLE READER CIRCUITRY

CROSS-REFERENCE TO RELATED APPLICATIONS

This application is a continuation of U.S. patent application Ser. No. 15/692,501, entitled "DISPLACEABLE READER CIRCUITRY," filed on Aug. 31, 2017, which is a continuation of U.S. patent application Ser. No. 14/312,524, entitled "TERMINAL CASE WITH INTEGRATED DUAL READER STACK," filed on Jun. 23, 2014, the contents of which are hereby expressly incorporated herein by reference in their entireties.

BACKGROUND

1. Technical Field

The subject application relates to a case for a mobile point of sale (POS) terminal and in particular, to a case for a mobile device that includes multiple card reader devices configured for reading different payment card formats.

2. Introduction

The increasing prevalence of mobile computing devices, such as smart phones and tablet computers, has spurned an increase in popularity for protective carrying cases. While some cases provide mechanical functionality, such as protective or carrying features, most conventional cases do not provide hardware enhancements or offer expanded communication functionality.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description, which includes specific details for the purpose of providing a more thorough understanding of the subject technology. However, it will be clear and apparent that the subject technology is not limited to the specific details set forth herein and may be practiced without these specific details. In some instances, structures and components are shown in block diagram form in order to avoid obscuring the concepts of the subject technology.

The subject technology relates to a multi-purpose card reader device (e.g., a stacked card reader) configured to accept payment cards of different formats. Specifically, a stacked card reader of the subject technology provides multiple hardware modules configured for reading financial information from different payment card types, such as magnetic stripe payment cards and/or integrated circuit (IC) type payment cards. Financial information read by the stacked card reader is provided to a mobile host device, such as a mobile computer or tablet device, etc., for use in facilitating a financial transaction between a buyer and a seller.

A stacked card reader of the subject technology can be implemented either as an attachable peripheral device (e.g., that is attachable to a mobile host), or mechanically integrated into a case that is configured for cooperation around the mobile host. In aspects where the card reader is integrated within a case, the case can include different numbers of parts (or pieces) that fit around one or more edges of the enclosed mobile device. In some implementations, the case includes two portions, i.e., a "body" portion, and a "base" portion.

As discussed in further detail below, a case of the subject technology (which includes an integrated stacked card reader) can include a communication channel that provides an electrical coupling to the mobile device. For example, a communication channel coupled to the stacked card reader can be configured to provide signaling to the host device via a protruding plug or audio jack, such as a headphone jack. As such, the case, together with the integrated stacked card reader, can be used to expand functionality of the mobile device so that the unit can function as a versatile mobile point of sale (POS) terminal, capable of receiving payment cards of different formats, such as magnetic stripe payment cards and integrated circuit payment cards.

Physical integration of the card reader (e.g., card reader hardware and circuitry) in the case can vary depending on case design. In certain aspects, the card reader can be integrated into a base of the case that mechanically couples with a larger portion, e.g., a body portion, to retain/cover or surround edges of a tablet computer or smartphone device. In another implementation, the body portion and the base portion may be substantially similar in size, such that each individual portion comprises approximately half of the overall size of the case. Additionally, in yet another implementation, the case can include a single piece, e.g., one contiguous portion. In such implementations, and audio plug protruding inward from the case may be configured to permit the plug to swivel/rotate in a manner that allows the plug to connect with a corresponding headphone port of the mobile device inserted into the case. It is understood that in different implementations, the card reader can be differently disposed within the case; for example, the card reader can be placed in a larger (body) portion, whereas a smaller (base) portion may contain no reader hardware or circuitry.

In order to provide financial payment card information to the mobile host, the stacked card reader is coupled to a communication channel which can include a protruding segment configured for insertion into an audio port (headphone port) of the mobile host device. In certain aspects, the protruding segment of the connector is configured in a tip-ring-ring-sleeve (TRRS) configuration, for example, such as that of a 3.5 mm audio jack or plug that includes left and right audio channels, as well as a microphone channel. In certain aspects, a low-profile form factor for the case may be implemented, wherein the TRRS connector is connected to the stacked reader using a modified (shortened) base portion.

Figure 1A:
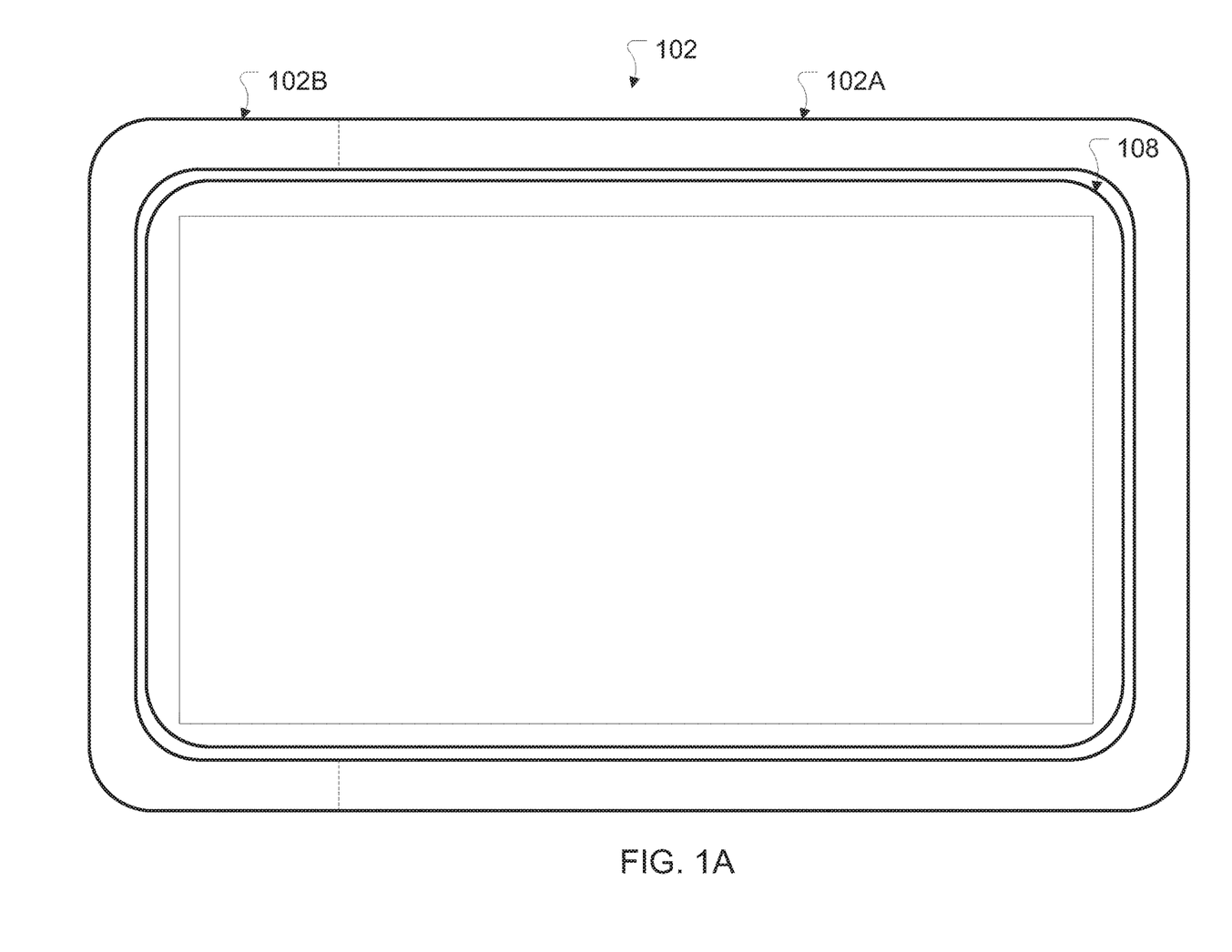
FIG. 1A illustrates an example of a front perspective view of a case of the subject technology, as used with a mobile computing device, according to some aspects.

FIG. 1A illustrates an example of an implementation of an assembled case 102 of the subject technology which contains a mobile device 108. The assembled case 102 includes an integrated stacked card reader (not illustrated). As implemented in the example of FIG. 1A, assembled case 102 includes two separable portions: body portion (body) 102A, and a base portion (base) 102B.

The mechanical coupling of body 102A with base 102B forms assembled case 102, which surrounds mobile device 108. A stacked reader device contained within assembled case 102 can be electrically/communicatively coupled with mobile device 108 using a protruding plug (not illustrated), e.g., to facilitate the transfer of financial information from the stacked reader to the mobile device. Although different types of plugs/connectors may be used to facilitate information transfer between the stacked reader device and mobile device 108, it is understood that aspects of the subject technology is not restricted to a particular type of communication channel or bus. By way of example, a communication channel between mobile device 108 and reader circuitry contained within case 102 can be accomplished using any of: a Universal Serial Bus (USB), an audio channel (e.g., a 3.5 mm audio plug), FireWire, a High Performance Parallel Interface (HIPPI), a Lightening connector, or a dock connector (e.g., a 30-pin dock connector), etc.

Figure 1B:
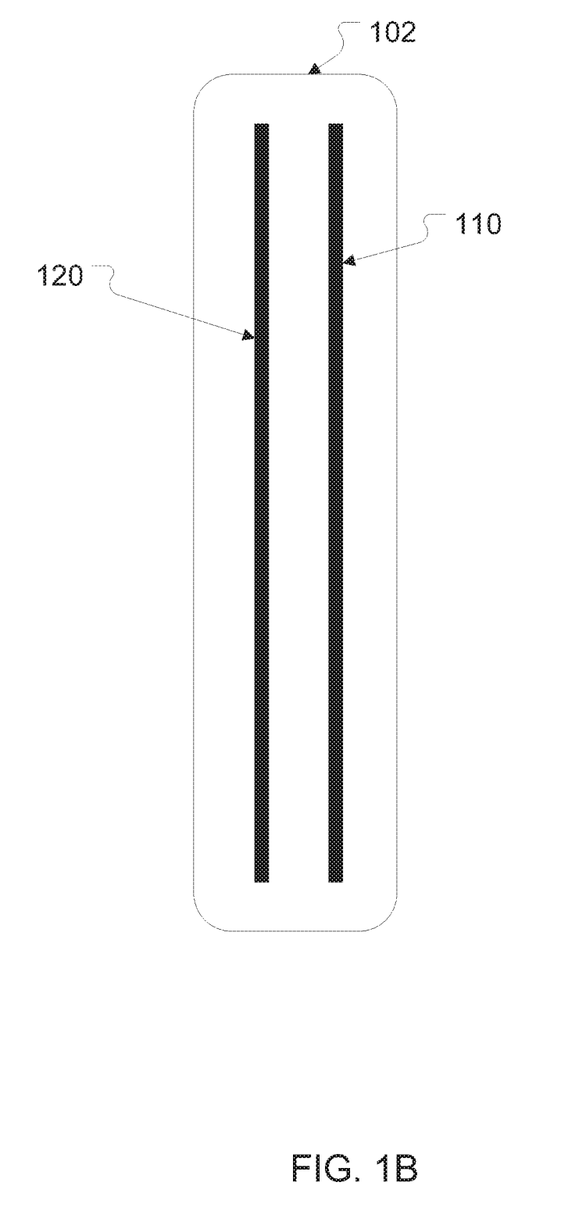
FIG. 1B illustrates an example of an end perspective view of a case which includes multiple slots for reading payment cards of different formats, according to some implementations of the technology.

FIG. 1B illustrates an example of an end perspective view of case 102 which first card slot 110 and second card slot 120 are depicted. It is understood that first card slot 110 and second card slot 120 are not limited to an end position on case 102 and can be placed on any portion of the case, depending on the desired implementation. For example, first card slot 110 and second card slot 120 can be disposed either on body 102A, or base 102B. Similarly, first card slot 110 and second card slot 120 can be provided in different orientations with respect to case 102, such as on a front side of case 102, so that the card slots face outward or upward relative to a direction of the mobile device screen.

First card slot 110 and second card slot 120 provide physical openings into which financial payment cards can be swiped (or inserted/dipped) for reading by stacked card reader circuitry in case 102. It is understood that various card reader circuitry implementations can be realized without departing from the scope of the technology. For example, first slot 110 can be configured to receive a magnetic stripe payment card and to facilitate reading of the magnetic stripe payment card by the integrated card reader. Similarly, second card slot 120 can be configured as a dip-slot and implemented to facilitate reading of an integrated circuit (IC) card by the reader circuitry, e.g., a financial payment card that conforms to the Europay MasterCard and Visa (EMV) global standard.

In operation, first card slot 110 and second card slot 120 are configured to receive payment cards of different format types such that each of the card slots facilitate the physical swiping/dipping of a financial payment card of a different type/format. When combined in the manner depicted by the example of FIG. 1B, a mobile device (such as a tablet computer or smart phone) may be used as a mobile POS terminal configured to accept different payment card formats.

In one example implementation, first card slot 110 is integrated with a magnetic stripe read module (e.g., first read circuitry), whereas second card slot 120 is integrated with an integrated circuit read module (e.g., second read circuitry). By having first card slot 110 and second card slot 120 disposed on case 102 in a parallel configuration, the respective first read circuitry and second read circuitry can be arranged to share common electrical components, e.g., in a stacked layout. For example, the first read circuitry and second read circuitry can be arranged in a PCB layout such that respective circuitry for reach read module is positioned on a different side of the PCB, e.g., in a "stacked" configuration. As a result, the card reader circuitry of the subject technology can be implemented with a smaller form factor, as compared to designs in which separate (unstacked) reader circuitry is used for reading cards of different formats/types.

It is understood that the use of card slots on case 102 can be differently configured, depending on implementation. For example, a single slot may be used, whereby different areas of the single slot correspond with receptacles for different card types. In such an implementation, a single (longer) slot may be used for receiving a magnetic stripe card, and a portion of the slot marked to indicate an area where the dip-slot is located. For example, an IC type payment card can be inserted into the same slot, in a direction perpendicular to that of the direction of the card swipe for a magnetic stripe payment card.

Figure 1C:
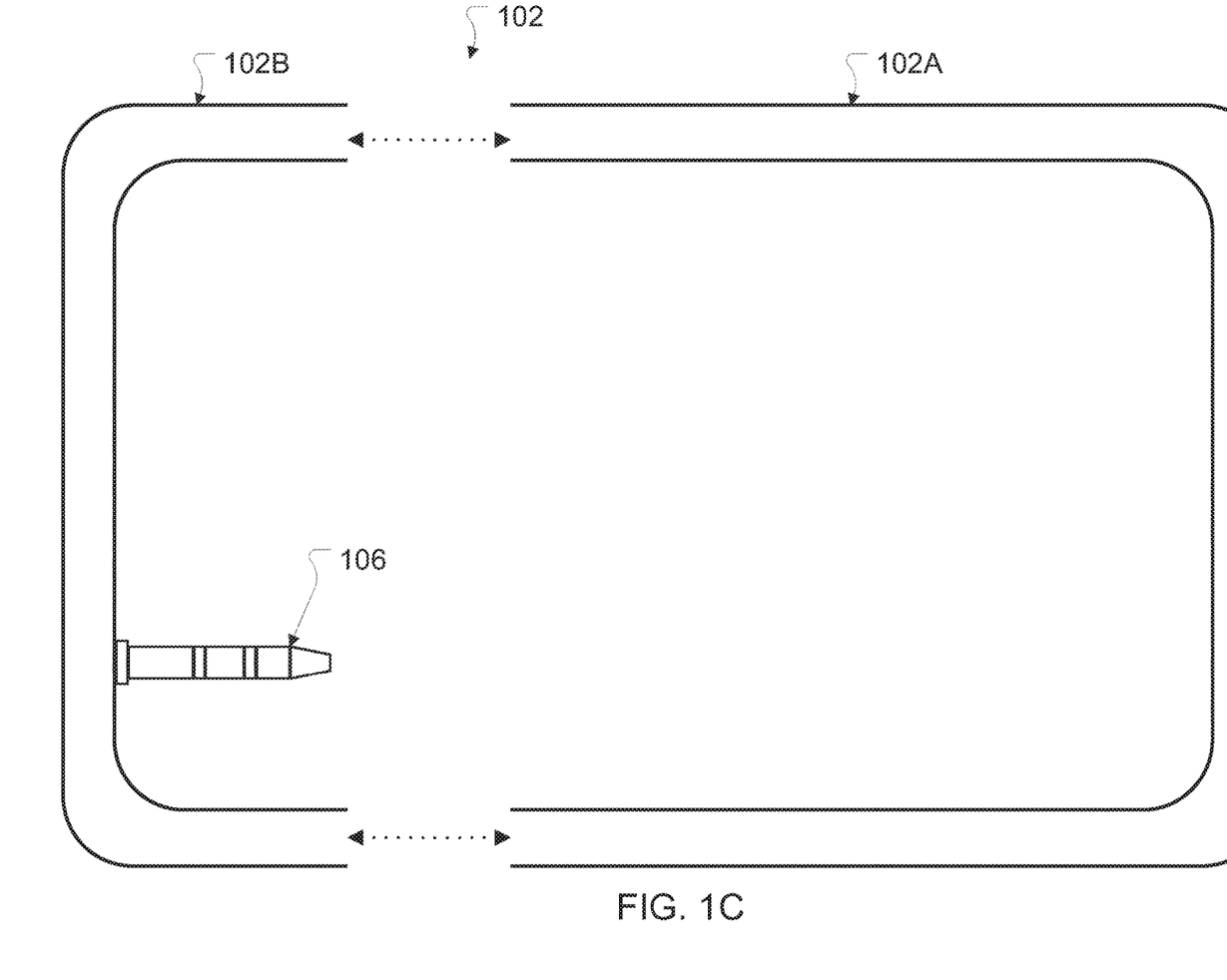
FIG. 1C illustrates an example of a front perspective view of a case of the subject technology (without a mobile computing device), according to some implementations of the technology.

FIG. 1C illustrates an example of case 102 in which body 102A and base 102B are separated and wherein mobile device 108 is omitted. As illustrated in the example of FIG. 1C, case 102 includes protruding plug 106, which provides a communication channel between the stacked reader circuitry and a host computing device, e.g., mobile device 108 of FIG. 1A. Although plug 106 illustrated in the example of FIG. 1C is a 3.5 mm audio jack, it is understood that various types of communication devices/channels may be used to facilitate information exchange between the stacked reader circuitry and the host mobile device. By way of example, other wired communication buses may be used, such as a Universal Serial Bus (USB) type adaptor, 32-pin connector or Lightening connector, etc. In other embodiments, one or more wireless devices or radios (such as Bluetooth or Bluetooth low-energy devices) may be used to facilitate information exchange between the stacked reader circuitry and the mobile electronic device.

In operation, a communicative coupling is formed between the stacked reader circuitry of case 102 and the host mobile device when plug 106 is physical coupled with the host mobile device 108, for example, upon insertion of plug 106 into the host mobile device 108. As shown in this example, the complete fitting of case 102 onto host mobile device 108 includes the mechanical integration of base 102B with body 102A.

Figure 2:
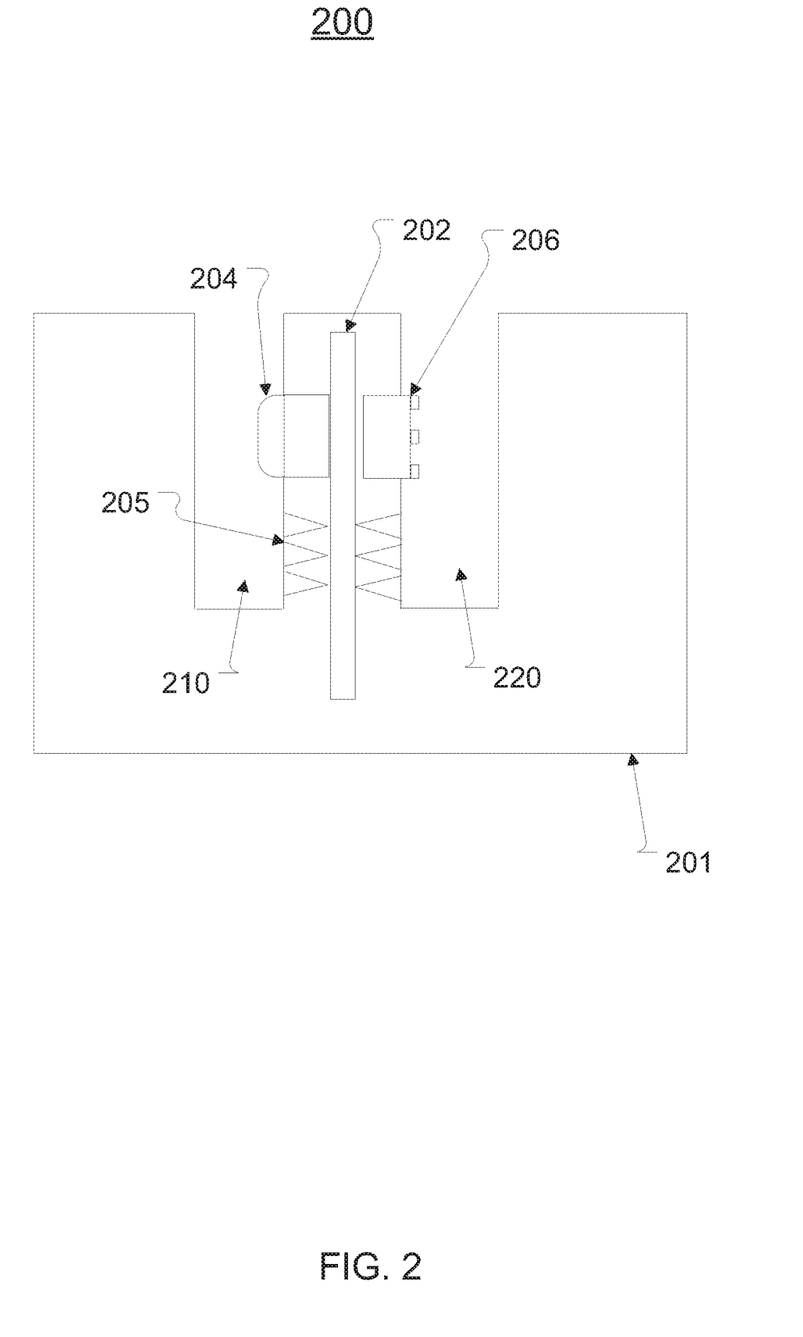
FIG. 2 depicts a side view of an example stacked card reader, according to some aspects of the technology.

FIG. 2 illustrates an example implementation of a stacked card reader 200, according to aspects of the subject technology. Specifically, FIG. 2 illustrates a side cut-away perspective view of stacked card reader 200, which is integrated into surrounding case 201, e.g., with first card slot 210 and second card slot 220. As illustrated, card reader 200 includes PCB/controller 202, magnetic stripe read module 204, displacement mechanism 205, and integrated circuit (IC) read module 206.

Although magnetic stripe read module 204 and IC read module 206 can be differently configured depending on implementation; in the illustrated example, magnetic stripe read module 204 represents a magnetic element, such as a magnetic read head, configured for producing a time-varying voltage signal upon the proximate passage of a magnetic stripe (e.g., of a magnetic stripe payment card). Similarly, IC read module 206 is configured to use a contact element such as projections or a read-pad etc., for forming electrical contact with an embedded chip (integrated circuit) of a payment card, such as that conforming to the Europay MasterCard and Visa (EMV) global standard, as discussed above.

In some embodiments the first card slot, stacked reader circuitry, and the second card slot are aligned in the same geometric plane such that a cross section of a portion of the device would expose portions of the first card slot the stacked reader circuitry, and the second card slot. In some embodiments, the magnetic element for reading a magnetic strip of a payment card and the contact element for reading the IC card can also be located in substantially the same geometric plane.

Additionally, in the illustrated example, PCB/controller 202 represents a printed circuit board (PCB) with an integrated controller (e.g., microprocessor) for use in controlling operation of magnetic stripe read module 204 and IC read module 206. In certain aspects, PCB/controller 202 is coupled to a smart phone (not illustrated), for example via an audio channel, such as audio plug 106, discussed above.

Although magnetic stripe read module 204 and IC read module 206 are illustrated as 'stacked' around PCB/controller 202, it is understood that functionality provided by PCB/controller 202 can be provided in other hardware modules residing separate from magnetic stripe read module 204 and IC read module 206. That is, PCB/controller 202 is not necessary for certain implementations of the technology that implement a stacked configuration of magnetic stripe read module 204 and IC read module 206. For example, magnetic stripe read module 204 and IC read module 206 can be similarly stacked around an electronically functionless (i.e., dumb) tray or other electronically functionless mount, without departing from the scope of the subject technology.

By way of further example, a controller (or other electronic functionality of PCB/controller 202) can be provided by hardware modules residing in other portions of card reader 200, such as in surrounding case 201. In some aspects, such hardware modules are connected to magnetic stripe read module 204 and/or IC read module 206, for example, via a control bus or using a flex cable.

In some implementations, PCB/controller 202 is configured such that magnetic stripe read module 204 and IC read module 206 can be coupled (both electrically and physically) to opposite sides of PCB 202, e.g., a first surface and a second surface. In this configuration, magnetic stripe read module 204 and IC read module 206 are "stacked" for example, to enable integration with corresponding first card slot 210 and second card slot 220. The configuration of PCB 202 and the read modules (204, 206) facilitates the sharing of electrical componentry (e.g., use of controllers and/or microprocessors), in stacked card reader 200. As a result, stacked card reader 200 can be implemented using a smaller form factor than would be possible should the respective read modules (204, 206) be implemented using separate PCBs and/or controllers.

It is understood that other read module configurations can be implemented with PCB 202. For example, stacked reader circuitry on PCB 202 can be configured such that it is mechanically loaded (e.g., spring loaded) using displacement mechanism 205, such that insertion of a payment card, in either first card slot 210 or second card slot 220, causes a physical bias of the PCB assembly in an opposite direction away from its neutral position, thereby permitting insertion of a payment card in a respective card slot. By way of example, an IC payment card inserted into second card slot 220 causes physical displacement of PCB 202 (e.g., in a direction of first card slot 210) away from its neutral position, such that simultaneous insertion of a different payment card into first card slot 210 is inhibited. When a payment card is removed the stacked reader circuitry can return to its neutral position.

In another aspect, read modules 204, 206 can be coupled to the same side of PCB 202, such as the first surface (or the second surface) of PCB 202. In such implementations, a magnetic read head of magnetic stripe read module 205 can be configured to pass through PCB 202, upon displacement of the read head caused by the passage of a magnetic stripe payment card. In such configurations, a size of stacked card reader 200 can be further reduced, for example, by at least the thickness of PCB 202, due to the fact that the read head of magnetic stripe read module 206 can pass through PCB 202.

A reduced form factor of the card reader, due to the 'stacked' configuration of read modules (204, 206) can improve security of the device, for example, by reducing an amount of room around the reader circuitry that may be used to tamper with the device. Additionally, in some aspects, PCB 202 can be constructed of stacked copper layers including one or more anti-tamper mesh portions (e.g., disposed on an outer layer of PCB 202), to prevent malicious interference with PCB 202, for example, by drilling down into the PCB to attach additional wires.

In practice, read modules (204, 206) and PCB 202 can be configured such that the entire assembly shifts upon insertion of a financial payment card into either first card slot 210, or second card slot 220. For example, a magnetic stripe payment card inserted into first card slot 210 causes PCB 202 (and consequently IC read module 206) to be biased (to the right) to permit passage of the payment card past magnetic stripe read module 204. The configuration of the surrounding case provides support for movement of the assembly. In some configurations in which read modules 204 and 206 are movable, the form factor of the entire stacked card reader 200 assembly may be further reduced in size, for example, to permit the insertion/swiping of one payment card at a time.

Figure 3:
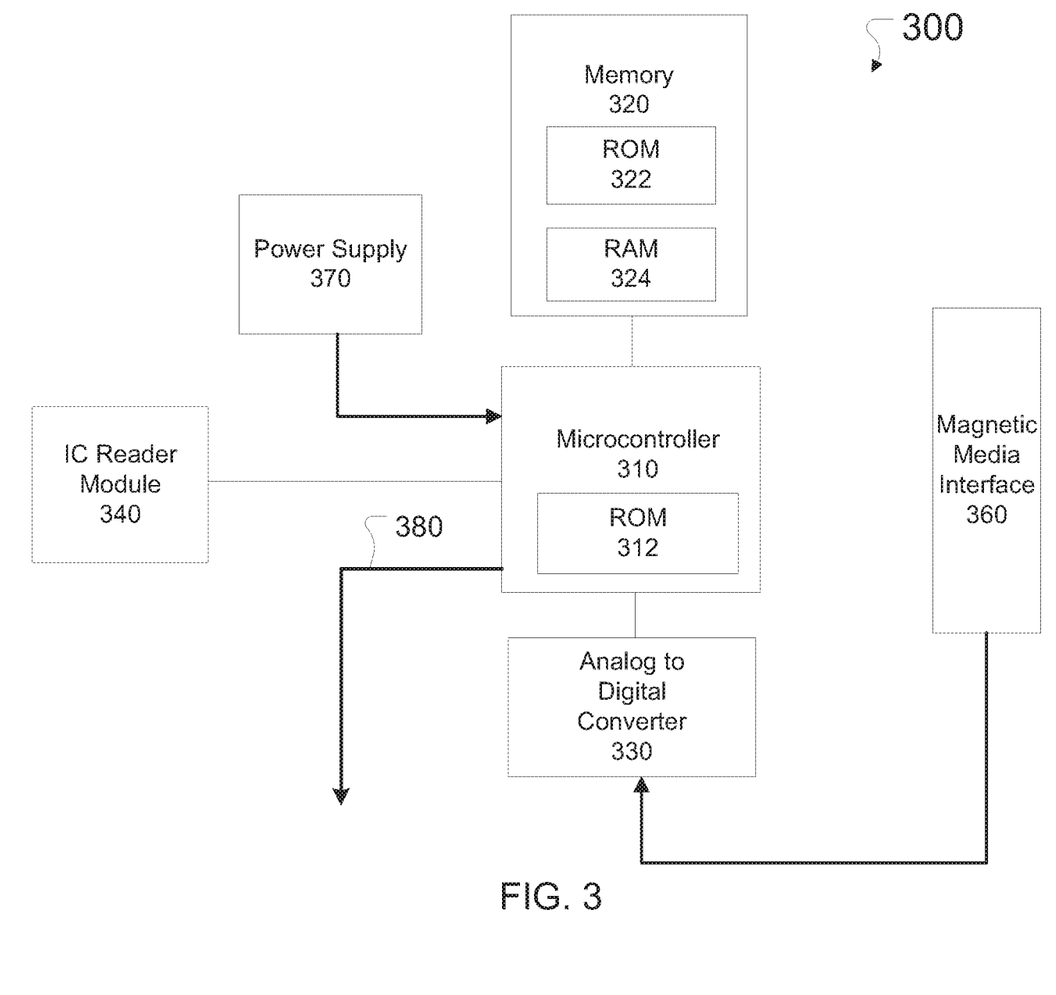
FIG. 3 conceptually illustrates an example configuration of hardware modules for implementing a stacked card reader, according to some aspects of the subject technology.

FIG. 3 depicts an example block diagram of hardware components used to implement a stacked card reader 300 of the subject technology. Stacked card reader 300 includes microcontroller 310, memory 320, analog-to-digital converter (ADC) 330, IC read module 340, media interface 360, and power supply 370.

As illustrated, microcontroller 310 is coupled to memory 320, and ADC 330. Additionally, microcontroller 310 is coupled to IC read module 340, as well as media interface 360, either via ADC 330. Additionally, microcontroller 310 is coupled to communication channel 380, which, as described above, can further include a plug (e.g., plug 106) for use in providing a communicative link between microcontroller 310 and a host mobile device (not illustrated). In some implementations, communication channel 380 can be configured to provide electrical/communicative contact with a protruding plug (e.g., plug 106), such as a TRRS connector, for example, that is configured for insertion into the headphone port of a mobile computing device.

In some implementations, power supply 370 is a battery configured for delivering power to microcontroller 310. However, power supply 370 is not limited to a current storage device. For example, power supply 370 can include a power interface e.g., to an external power supply or power source. By way of example, power supply 370 can provide a coupling to a microphone-line (e.g., of a 3.5 mm TRRS plug) for drawing current from an active device, such as an in-line microphone.

It is understood that stacked reader device 300 can be implemented using various other hardware components and/or configurations, and is not limited to the architecture depicted in FIG. 3. By way of example, microcontroller 310 can be implemented using a general-purpose processor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing.

Memory 320 can include various types of memories, including working memory in the form of random-access memory (RAM) 324 and read-only memory (ROM) 322. Additionally, various types of memory can be utilized in place of, or in addition to, memory 320. For example, the one or more sequences of instructions for operating stacked reader device 300 can be stored as software or firmware in a ROM 322 within microcontroller 310 or in the ROM 322 within memory 320. One or more sequences of instructions can also be software stored and read from another storage medium, such as the flash memory array, or received from the host computing device (e.g., a mobile device such as a smart phone or tablet computing device) via a host interface. ROM, storage mediums, and flash memory arrays represent examples of machine or computer readable media storing instructions/code executable by microcontroller 310. Machine or computer readable media may generally refer to any medium or media used to provide instructions to microcontroller 310, including both volatile media, such as dynamic memory used for storage media or for buffers within microcontroller 310, and non-volatile media, such as electronic media, optical media, and magnetic media.

Magnetic media interface 360 can form a device, or portion thereof, for reading media located on credit cards, debit cards, or objects to obtain payment information. In some implementations, magnetic media interface 360 can be configured to read information from a physical storage medium, such as magnetic storage media (e.g., magnetic stripe media). However, in other implementations, magnetic media interface may be configured for reading other types of electrical or magnetic media.

Similarly, IC read module can be configured for reading integrated circuits, and in particular, embedded circuitry used with financial payment cards, such as IC payment cards.

Figure 4:
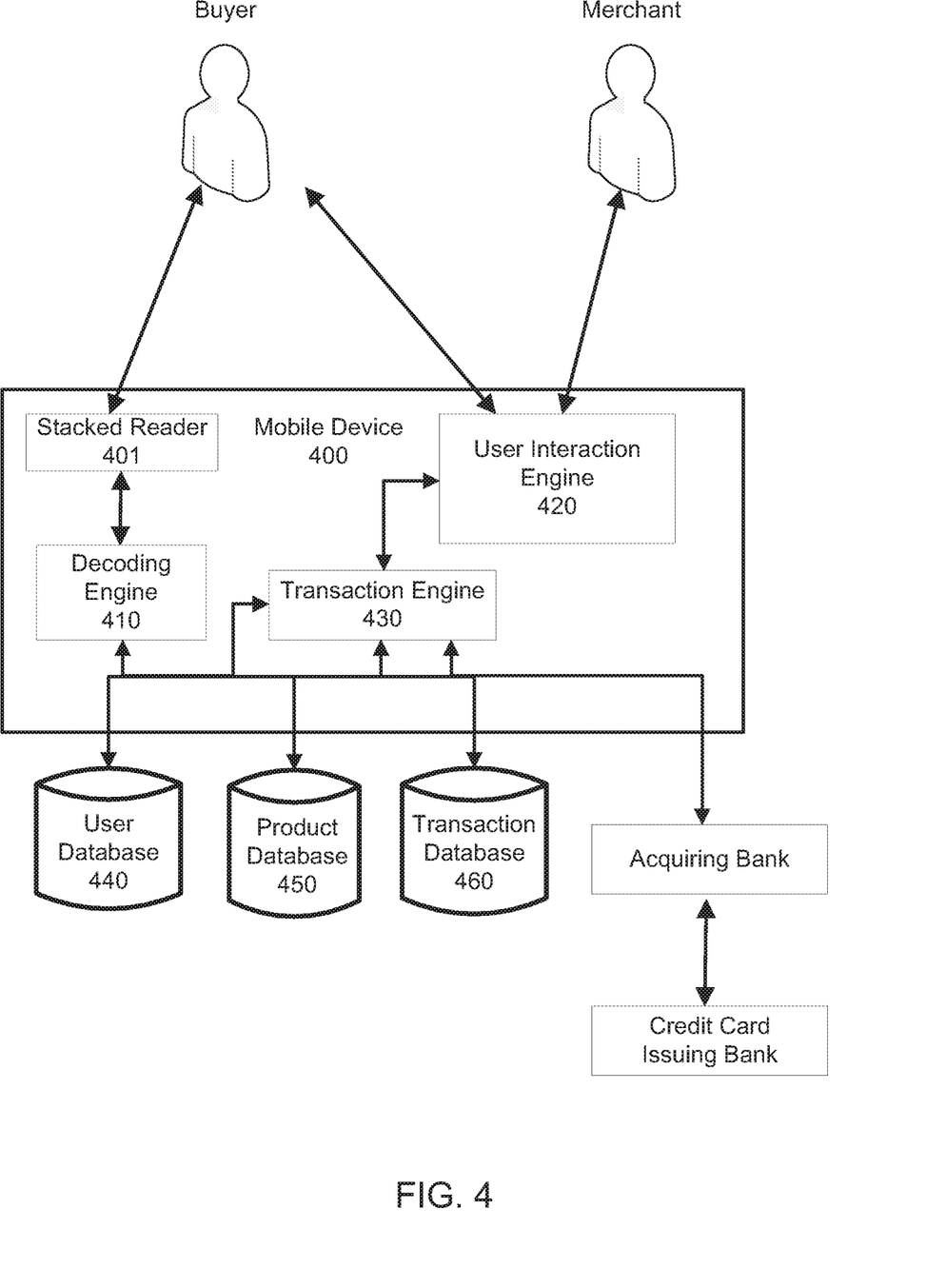
FIG. 4 conceptually illustrates an example environment in which a case containing a stacked card reader can be used to facilitate a financial transaction between a buyer and a merchant.

FIG. 4 illustrates an example environment in which a case and card reader may be used. It will be apparent that the components portrayed in FIG. 4 can be arbitrarily combined or divided into separate software, firmware and/or hardware components. Furthermore, it will also be apparent that such components, regardless of how they are combined or divided, can execute on the same host or multiple hosts, and wherein multiple hosts can be connected by one or more networks.

In the example of FIG. 4, the system includes a mobile device 400, a stacked reader 401 connected to mobile device 400, a decoding engine 410, a user interaction engine 420, and a transaction engine 430, all running on mobile device 400. Additionally, the system may also include one or more of a user database 440, a product or service database 450, and a transaction database 460, all coupled to the transaction engine 430.

Consistent with aspects of the subject technology, stacked reader 401 can be physically integrated into a case, such as that discussed above with respect to FIGS. 1A-C, which contains or surrounds mobile device 400.

As used herein, the term engine can refer to software, firmware, hardware, and/or other components used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically involves the execution of drivers. The drivers may or may not be considered part of the engine, but the distinction is not critical.

As used herein, the term database is used broadly to include any known or convenient means for storing data, whether centralized or distributed, relational or otherwise.

In the example of FIG. 4, mobile device 400 to which stacked reader 401 is connected can be, but is not limited to, a cell phone, such as Apple's iPhone, other portable electronic devices, such as Apple's iPod Touches, Apple's iPads, and mobile devices based on Google's Android operating system and any other portable electronic device that includes software, firmware, hardware, or any combination capable of at least receiving the signal, decoding if needed, exchanging information with a transaction server to verify the buyer and/or seller's account information, conducting the transaction, and generating a receipt. Typical components of mobile device 400 can include but are not limited to persistent memories like flash ROM, random access memory like SRAM, a camera, a battery, LCD driver, a display, a cellular antenna, a speaker, a Bluetooth circuit, and WiFi circuitry, where the persistent memory may contain programs, applications, and/or an operating system for the mobile device.

In some implementations, a system is provided with transaction engine 430 running on mobile device 400. In response to a financial transaction between a buyer and a seller, mobile device 400 accepts information selected including but not limited to information from financial transaction or information pertaining to financial transaction card used by the buyer in the transaction. Additionally, a financial transaction device can be utilized, Non-limiting examples of financial transaction devices include but are not limited to a, wristband, RFID chip, cell phone, biometric marker and the like. At least a portion of this information is communicated with a third party financial institution or payment network to authorize the transaction.

Payment confirmation can be made with a communication channel of the buyer's choice. As non-limiting examples, confirmation of payment can be an electronic notification in the form selected from at least one of, email, SMS message, tweet (message delivered via Twitter), instant message, communication within a social network and the like. In response to the transaction, a confirmation is made that the buyer is authorized to use the financial transaction card. In certain implementations, a confirmation can be provided that indicates a sufficiency of funds available to the buyer.

In the example of FIG. 4, stacked reader 401 is configured to read data encoded in either a magnetic strip (or IC) of a card being swiped by a buyer and send a signal that corresponds to the data read to mobile device 400. However, as discussed above, stacked reader 401 is configured to receive various payment card types, including but not limited to IC cards that can be provided to reader 401 using a dip-slot.

The size of reader 401 can be miniaturized to be portable for connection with mobile device 400. For example, the size of stacked card reader 401 can be miniaturized to an overall length of less than 1.5". In addition, the miniaturized stacked card reader 401 is also designed to reliably read the card with minimum error via a single swipe by counteracting vendor specific filtering done by mobile device 400. Note that this broad overview is meant to be non-limiting as components to this process are represented in different embodiments.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, flash memory (e.g., SD cards, mini-SD cards, micro-SD cards, etc.), magnetic and/or solid state hard drives, read-only and recordable Blu-Ray® discs, ultra density optical discs, any other optical or magnetic media. The computer-readable media can store a computer program that is executable by at least one processing unit, such as a microcontroller, and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A payment object reader comprising:
a first slot of a plurality of slots, the first slot configured for receiving a magnetic stripe of a magnetic stripe payment card;
a second slot of the plurality of slots, the second slot configured for receiving an integrated circuit (IC) chip of an IC chip payment card; and
reader circuitry comprising magnetic stripe read circuitry and IC chip read circuitry electrically coupled to two respective printed circuit board (PCB) surfaces, wherein the magnetic stripe read circuitry is configured to read information from the magnetic stripe of the magnetic stripe payment card upon receipt of the magnetic stripe via the first slot, wherein the IC chip read circuitry is configured to read the information from the integrated circuit (IC) chip of the IC payment card upon receipt of the IC chip via the second slot, wherein at least a portion of the magnetic stripe read circuitry is configured to displace upon receipt of the magnetic stripe via the first slot, and wherein at least a portion of the IC chip read circuitry is configured to displace upon receipt of the IC chip via the second slot.

2. The payment object reader of claim 1, further comprising a battery that supplies power to the reader circuitry.

3. The payment object reader of claim 1, wherein at least the portion of the magnetic stripe read circuitry is configured to displace toward the second slot upon receipt of the magnetic stripe via the first slot.

4. The payment object reader of claim 1, wherein at least the portion of the IC chip read circuitry is configured to displace toward the first slot upon receipt of the IC chip via the second slot.

5. The payment object reader of claim 1, wherein an interior planar surface of the second slot is disposed parallel to an interior planar surface of the first slot.

6. The payment object reader of claim 1, further comprising a wireless transceiver that communicates the information from the payment object reader to a mobile computing device via at least one of Bluetooth™ or Bluetooth™ low-energy.

7. The payment object reader of claim 1, further comprising an electrical connector that conveys the information from the payment object reader to a mobile computing device.

8. The payment object reader of claim 1, further comprising a power interface connector that is configured to draw power from an external power source.

9. The payment object reader of claim 1, wherein the two respective printed circuit board (PCB) surfaces are surfaces of a single PCB.

10. The payment object reader of claim 1, further comprising tamper circuitry that detects malicious interference with either of the two respective printed circuit board (PCB) surfaces.

11. A payment object reader comprising:
a first printed circuit board (PCB) surface;
a second PCB surface;
a first type of read circuitry at least partially disposed along the first PCB surface, wherein the first type of read circuitry is configured to read information from a first type of payment object that passes beside the first PCB surface; and
a second type of read circuitry at least partially disposed along the second PCB surface, wherein the second type of read circuitry is configured to read the information from a second type of payment object that passes beside the second PCB surface and that displaces the second type of read circuitry.

12. The payment object reader of claim 11, further comprising:
power supply circuitry, wherein the power supply circuitry is configured to couple a battery to the first type of read circuitry and to the second type of read circuitry.

13. The payment object reader of claim 11, wherein the first type of reader circuitry is integrated circuit (IC) chip read circuitry and the first type of payment object is an IC chip card, wherein the second type of reader circuitry is magnetic stripe read circuitry and the second type of payment object is a magnetic stripe card.

14. The payment object reader of claim 11, wherein the first type of reader circuitry is magnetic stripe read circuitry and the first type of payment object is a magnetic stripe card, wherein the second type of reader circuitry is integrated circuit (IC) chip read circuitry and the second type of payment object is an IC chip card.

15. The payment object reader of claim 11, wherein the first type payment object displaces the first type of read circuitry while the first type payment object passes parallel to the first PCB surface.

16. The payment object reader of claim 11, wherein the first PCB surface and the second PCB surface are two surfaces of a single PCB.

17. The payment object reader of claim 11, wherein the second type of read circuitry at least partially passes through the second PCB surface while the second type of read circuitry is displaced.

18. A payment object reader, the payment object reader comprising:
a housing;
one or more slots in the housing, the one or more slots configured for receiving one or more payment objects; and
reader circuitry coupled to one or more printed circuit board (PCB) surfaces and at least partially disposed along an interior surface of a first slot of the one or more slots, wherein the reader circuitry is configured to read information from a first payment object of the one or more payment objects while the first payment object is at least partially received by the first slot and passes beside the reader circuitry, wherein at least a portion of the reader circuitry is configured to displace from a neutral position while the first payment object is at least partially received by the first slot and passes beside the reader circuitry.

19. The payment object reader of claim 18, wherein the reader circuitry includes magnetic stripe reader circuitry and the first payment object is a magnetic stripe payment card that is at least partially received by the first slot.

20. The payment object reader of claim 18, wherein the reader circuitry includes integrated circuit (IC) chip reader circuitry and the first payment object is an IC chip payment card that is at least partially received by the first slot.

* * * * *